United States Patent [19]

Wood et al.

[11] Patent Number: 4,747,194
[45] Date of Patent: May 31, 1988

[54] TIRE RASP BLADE

[75] Inventors: Samuel R. Wood, Warrawee; James S. Pincott, West Ryde, both of Australia

[73] Assignee: Spencer Industries Pty. Ltd., Auburn, Australia

[21] Appl. No.: 928,473

[22] Filed: Nov. 7, 1986

Related U.S. Application Data

[63] Continuation-in-part of Ser. No. 783,170, Oct. 2, 1985, abandoned.

[51] Int. Cl.⁴ .............................................. B23D 71/00
[52] U.S. Cl. ........................................... 29/78; 29/79
[58] Field of Search ............... 29/78, 79; 83/835, 846, 83/847; 407/52, 58, 59, 62

[56] References Cited

U.S. PATENT DOCUMENTS

| 2,896,309 | 7/1959 | Jensen | 29/79 |
| 3,082,506 | 3/1963 | Jensen | 29/79 |
| 3,351,997 | 11/1967 | Neilsen | 29/79 |
| 3,680,185 | 8/1972 | Wood | 29/79 |
| 3,879,825 | 4/1975 | Jensen et al. | 29/79 |
| 4,021,899 | 5/1977 | Jensen | 29/79 |
| 4,091,516 | 5/1978 | Jensen et al. | 29/79 |

FOREIGN PATENT DOCUMENTS 52877 4/1969 Australia .

Primary Examiner—Frederick R. Schmidt
Assistant Examiner—Robert Showalter
Attorney, Agent, or Firm—Pravel, Gambrell, Hewitt, Kimball & Krieger

[57] ABSTRACT

Rasp blades for removing rubber from tire carcasses to prepare them for retreading. The improved blades have a unique arrangement of the teeth in the blade wherein a plurality of sets of teeth are formed in the working edge, and wherein each set is formed with two pairs of teeth disposed at opposite angles of inclination to each other, and with each pair having a lead tooth and a trailing tooth formed by a narrow tooth dividing slit therebetween which extends sufficiently inwardly beyond the depth of recesses on each side of the pairs of teeth to provide tooth settings which give greater strength and more effective cutting edge exposure.

13 Claims, 6 Drawing Sheets

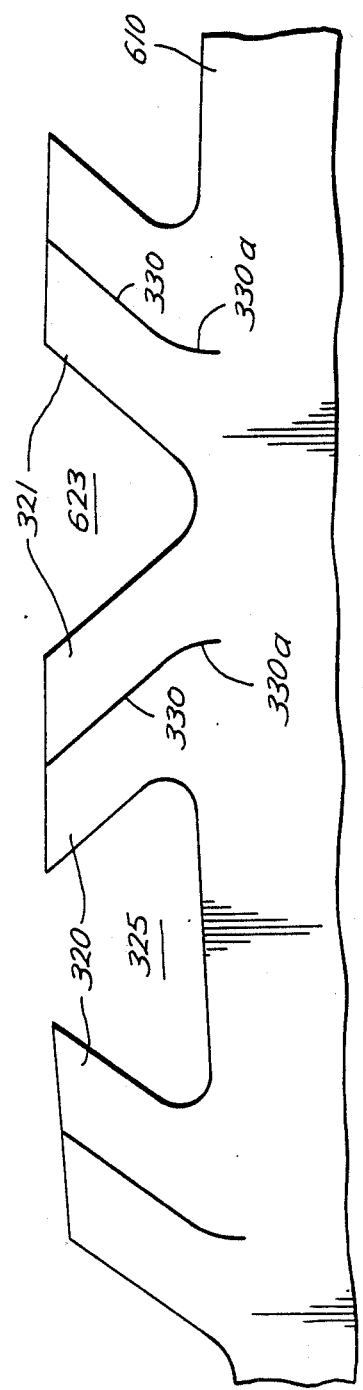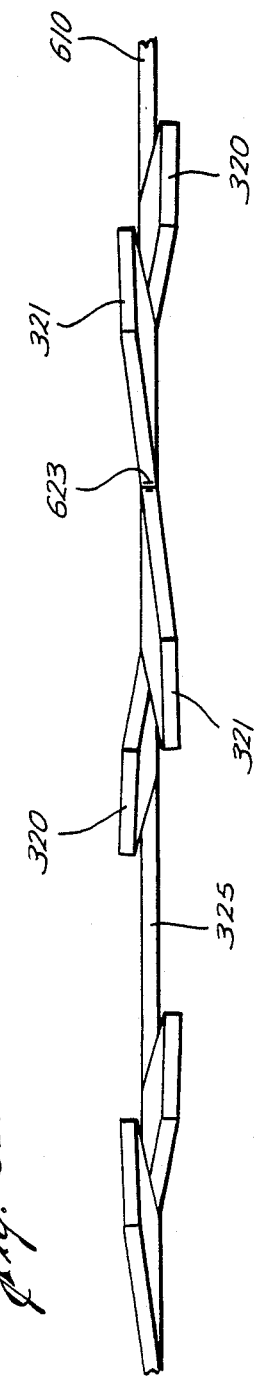

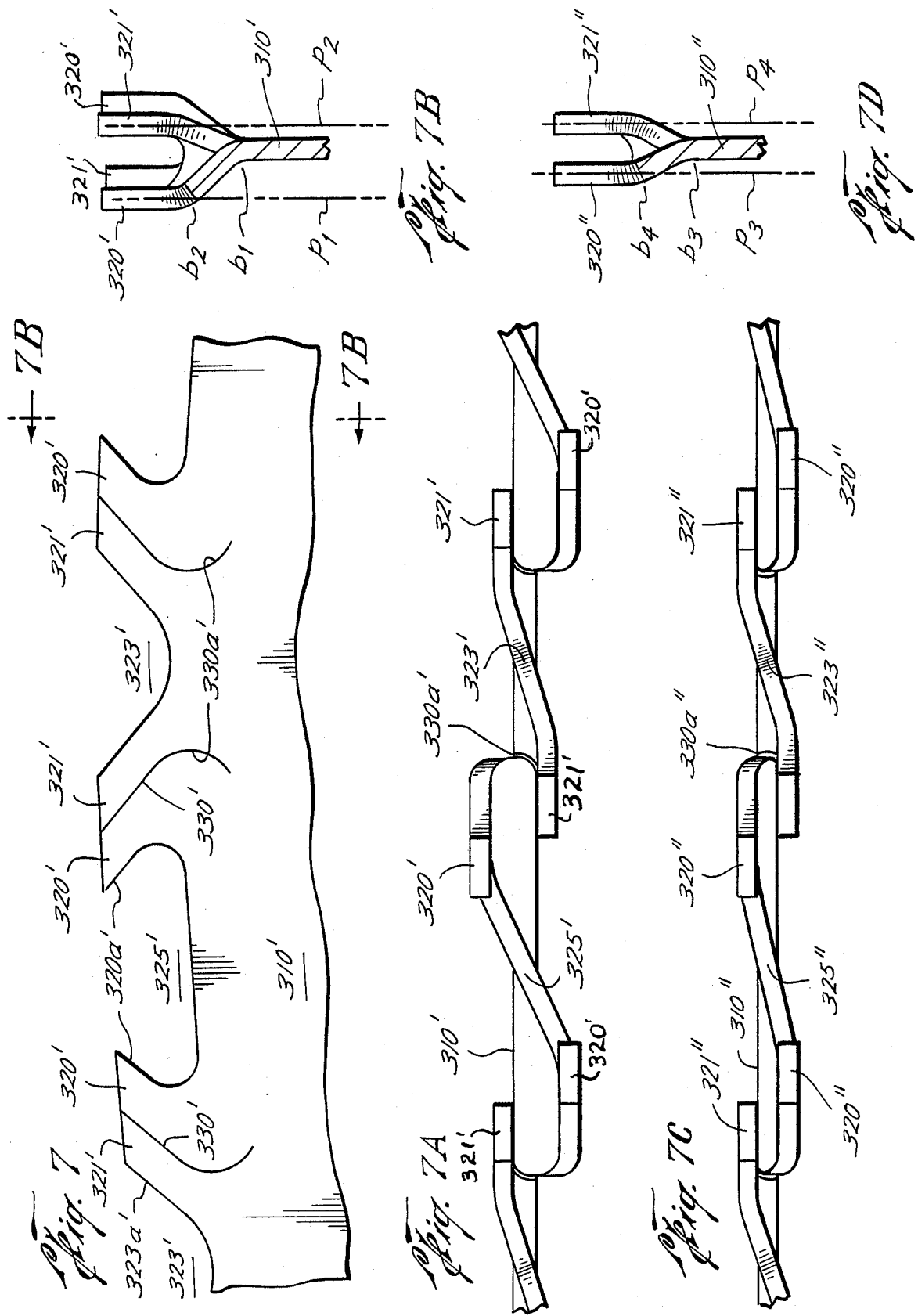

TIRE RASP BLADE

This is a continuation-in-part of Ser. No. 783,170 filed Oct. 2, 1985 for Tire Rasp Blade, now abandoned.

FIELD OF THE INVENTION

This invention relates to the field of rasp blades used for removing rubber from the tire carcass to prepare the tire carcass for retreading.

BACKGROUND OF THE INVENTION

Prior to applying a new tread to a tire carcass, it is necessary to prepare the surface of the carcass so that it is substantially uniform and has the proper shape and condition for receiving the tire retread material. It has been customary for a number of years to use a rotating hub with a large number of rasp blades mounted on the hub for cutting and buffing the surface of the tire carcass to prepare such surface for receiving the retread material. Such rasp blades have been used in numerous configurations and shapes in the prior art, examples of which are found in U.S. Pat. Nos. 3,680,185; 3,082,506; 2,896,309; 4,021,899; 3,879,825; 4,091,516; and Australian patent No. 442,257. So far as is known, the earliest rasp blade having rasp teeth made in sets of four with two pairs of teeth facing at opposite angles of inclination to each other with recesses between the teeth is in U.S. Pat. No. 3,680,185. The present invention is an improvement on the tire rasp blade of U.S. Pat. No. 3,680,185 in that it has more sets of teeth, and more metal left in each tooth, adding strength to minimize breakage of the teeth.

SUMMARY OF THE INVENTION

The present invention is a new and improved tire rasp blade which is used for forming a substantially uniform surface on a tire carcass, and for the purpose of preparing that surface for receiving retread material which is bonded or otherwise attached to the tire carcass. The tire rasp blade of this invention is preferably made with an arcuate shape and a plurality of sets of teeth at the outer working edge, with each set being formed by two pairs of teeth which pairs are disposed at opposite angles of inclination to each other and with the teeth in each pair being separated by an inclined narrow slit which has a curved portion at its inner end which preferably extends inwardly beyond the depth of the recesses between the teeth, to thereby facilitate a parallel setting of the teeth and to provide the blade with maximum strength in all of the teeth and with a minimum of breakage of the teeth during usage.

BRIEF DESCRIPTION OF THE DRAWINGS

FIG. 6 is an elevation of a blade similar to that shown in FIG. 4, but with the recesses all of the same depth;

FIG. 6A is a plan view of FIG. 6 with the teeth set;

FIG. 7 is an elevation of a blade similar to that shown in FIG. 4, but with the slits extended to a depth exceeding the depth of the recesses.

FIG. 7A is a is a plan view showing the preferred setting of the of FIG. 7;

FIG. 7B is an end view in the direction of the arrows 7B—7B showing further details of the setting shown in FIG. 7A;

FIG. 7C is a plan view showing an alternative setting of the blade of FIG. 7;

FIG. 7D is an end view of FIG. 7C showing further details of the setting shown in FIG. 7C;

DETAILED DESCRIPTION OF THE PREFERRED EMBODIMENTS

Figure 1:
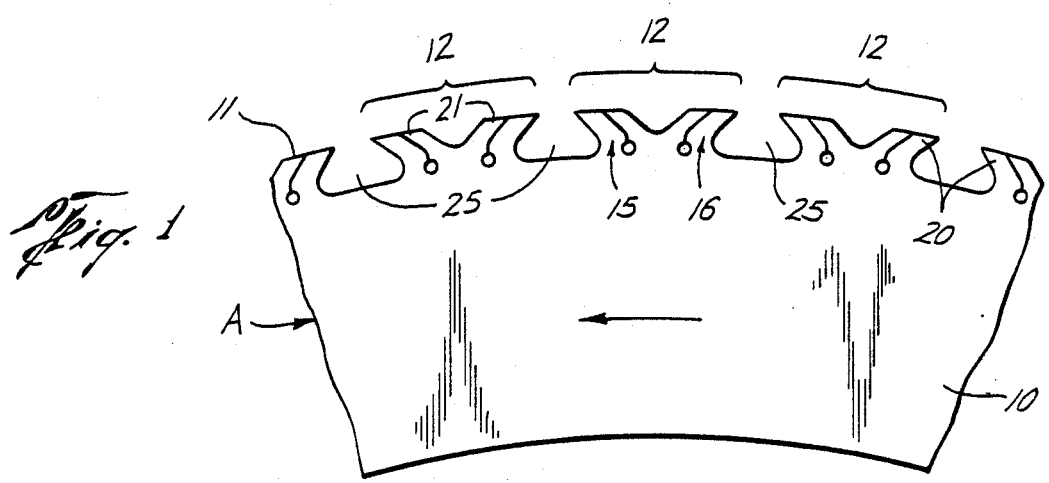
FIG. 1 is an elevation of a portion of the tire rasp blade of this invention in its preferred embodiment but showing the teeth all in the same plane.

In the drawings, the letter A designates generally the preferred embodiment of the tire rasp blade of this invention, a portion of which is illustrated in FIG. 1. The full rasp blade A has a length suitable for forming a segment of a circle for mounting each of the rasp blades A on a circular hub, as is well understood in the art and as is well illustrated in U.S. Pat. Nos. 3,680,185 and 3,879,825.

The rasp blade A includes an arcuate body 10 which is generally of a length so that four to six of such blades A form a complete circle for attachment to a circular hub which is used for rotating the blades relative to the tire to be cut or buffed. The body 10 is usually provided with spaced holes (not shown), through which pass pins carried in the hub and serving to attach the blade to the hub, as is well known. The blade A has an outer edge 11 which is a segment of a circle and which is formed with a plurality of sets of teeth 12. The sets of teeth 12 are repetitive and in the present invention each set includes four teeth, formed in a first pair 15 and a second pair 16, which are disposed at opposite angles of inclination to each other. The number of sets of teeth 12 in each rasp blade A may vary, but in the usual case would number from about ten to fifteen sets per blade.

The rasp blade A may be rotated in either direction on the hub and it may be reversed after a period of use so that the effective life of the tire rasp blade A is increased. Thus, if the blade A is rotated in a counter-clockwise direction relative to the tire being buffed, as indicated by the large arrow in FIG. 1, the pair of teeth 15 will have a lead tooth 20 and a trailing tooth 21.

A first recess 23 is formed at the outer edge in each set between the two pairs of teeth 15, 16 in each set 12.

Figure 2:
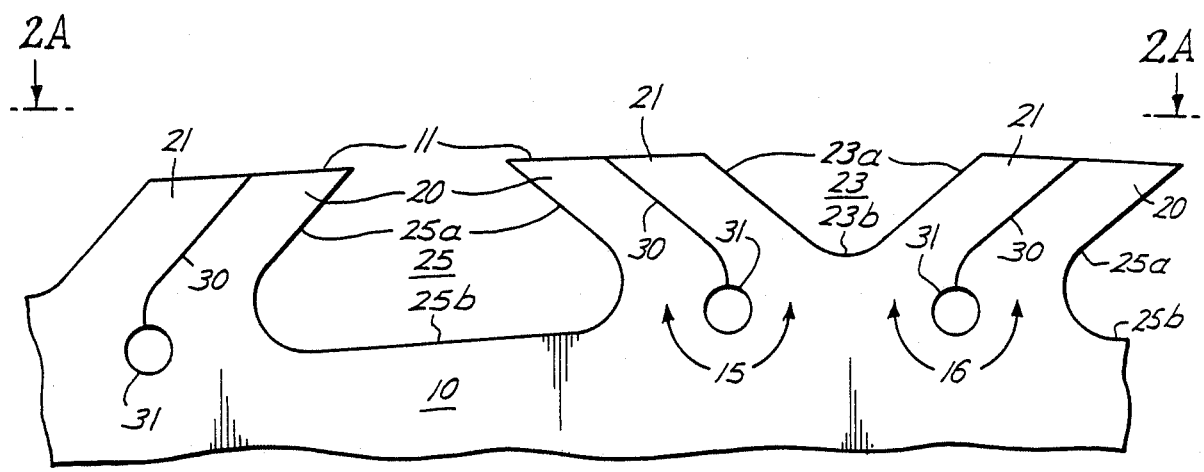
FIG. 2 is an enlargement of a portion of the rasp blade substantially as illustrated in FIG. 1.

In the preferred embodiment of FIGS. 1 and 2, the recess 23 has inclined edges 23a, one of which forms the trailing edge of the tooth 21 in the left hand pair as viewed in FIG. 2 and the other of which forms the leading edge of the tooth 21 in the right hand pair of FIG. 2. It will be appreciated that when the blade is reversed in use, the edge 23a of the tooth 21 in the left hand pair as shown in FIG. 2 will become the leading edge and similarly, the edge 23a in tooth 21 in the right hand pair in FIG. 2 will become the trailing edge.

The body 10 is formed with a plurality of second recesses 25, one on each side of each set 12 of the teeth, so that the leading edge 25a of the tooth 20 is formed by the edge of such recess 25. As illustrated in FIG. 2, the edge 25a of the left hand pair 15 of teeth 20 and 21 would form the leading edge of the tooth 20, whereas the other opposite edge 25a of the recess 25 which is inclined in an opposite direction forms the trailing edge of the tooth 20 in the right hand set 16 for the tooth 20. Again, when the teeth are reversed, the edges 25a will be reversed in terms of their serving as a leading or trailing edge for the teeth 20. The recess 25 has a lower edge 25b which connects up with the side edges 25a to form the complete cutout or recess in the upper or outer working edge 11 of the body 10. Although the preferred configuration or shape of the recesses 25 are preferably as illustrated to provide maximum strength in the teeth 20, other shapes or configurations for the recess 25 may be utilized.

Figure 4:
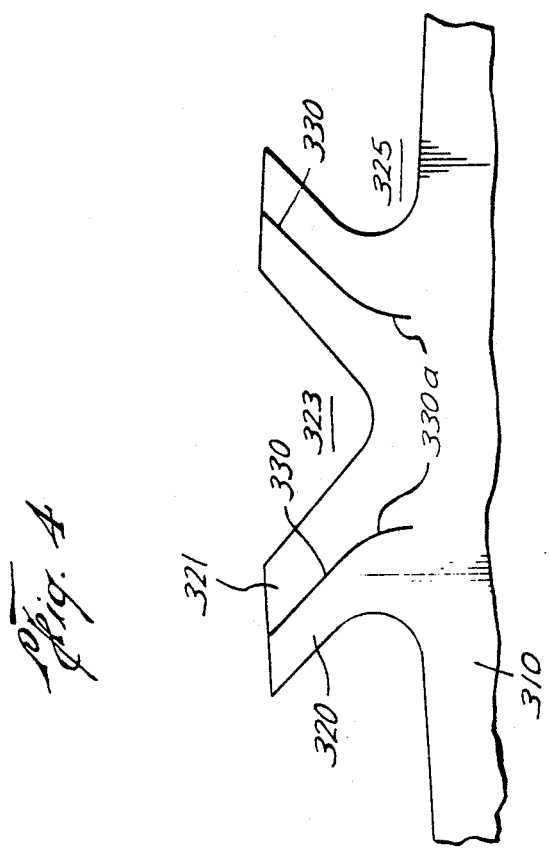
FIG. 4 is an elevation of a further modification of the rasp blade of this invention again showing all of the teeth in the same plane.

In the present invention, the teeth 20 and 21 in each of the pairs 15 and 16 are formed by slitting the metal forming the body 10 in a die or other similar mechanism to form the inclined slit 30 which extends from the outer working edge 11 inwardly to a point preferably below the intersection of the inclined surfaces 23a of the first recess 23. By forming the slit 30 as a narrow cut or slit in the metal of the body, rather than forming it as a cutout or slot with metal that is removed, the maximum amount of metal is left in the teeth 20 and 21 and therefore the maximum strength is obtained for the selected width of the two teeth 20 and 21 forming the pair 15. The same is true with respect to the teeth 20, 21 in the pair 16. It has been found that the use of the slit 30 by itself in place of the slot such as shown in U.S. Pat. No. 3,680,185, sometimes results in greater breakage of the teeth. In order to add strength at the inner end of the slit, a hole 31, larger than the narrow slit 30, may be provided to give a a circular distribution of the splitting forces which minimizes any tendency of the metal to split at the inner end of the slit 30, whereby breakage of the teeth 20 and 21 is reduced as compared to the use of the slit 30 alone. Alternatively, for the same purpose, FIG. 4 shows a modification in which the slit 330 is curved at its inner end 330a to terminate substantially radially at approximately the same depth as the depth of the second recess 325.

Figure 5:
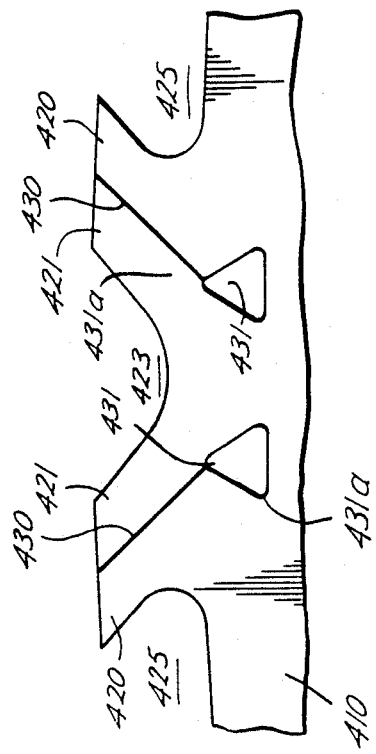
FIG. 5 is an elevation of still another modification of the rasp blade of this invention.

Also, in FIG. 5, for the same purpose, the holes 431 have been made in a triangular shape at the end of each slit 430. The triangular holes 431 can be somewhat greater in area than holes 31. Holes 431 are disposed so that the widths of the teeth 420 and 421 are not reduced.

Also, breaking of the teeth 21 is minimized by having the lower inner intersection of the edges 23a of the recess 23 formed in a curved edge 23b rather than a sharp point.

As best seen in FIG. 2, the width of each of the teeth 20 and 21 is substantially the same between the first recess 23 and the second recess 25. Also, it is preferable that, over the working portion of the tooth length, the leading edge 25a of the tooth 20 is substantially straight and substantially parallel to the slit 30 as well as to the edge 23a adjacent to the tooth 21 in the pair of teeth 15.

The same situation exists with respect to the pair of teeth 16, although in the opposite direction. By reason of such construction, both of the teeth 20 and 21 are of substantially equal strength and they bear substantially equal loads during use so that the distribution of the load forces is equalized and thus the breakage of the teeth 20 and 21 is minimized.

Also, the preferred embodiment of FIG. 2 has the narrow slit 30 formed at an angle from the outer edge 11, with the width of each of the teeth 20 and 21 throughout their lengths being at least as wide as at the outer edge 11. Such configuration is also true with respect to the other embodiments hereinafter described. By reason of each tooth having a width throughout its lengths which is at least as wide as at its outer edge, there are no reduced width portions in the teeth which would provide weaker areas that might result in breakage of the teeth.

Figure 3:
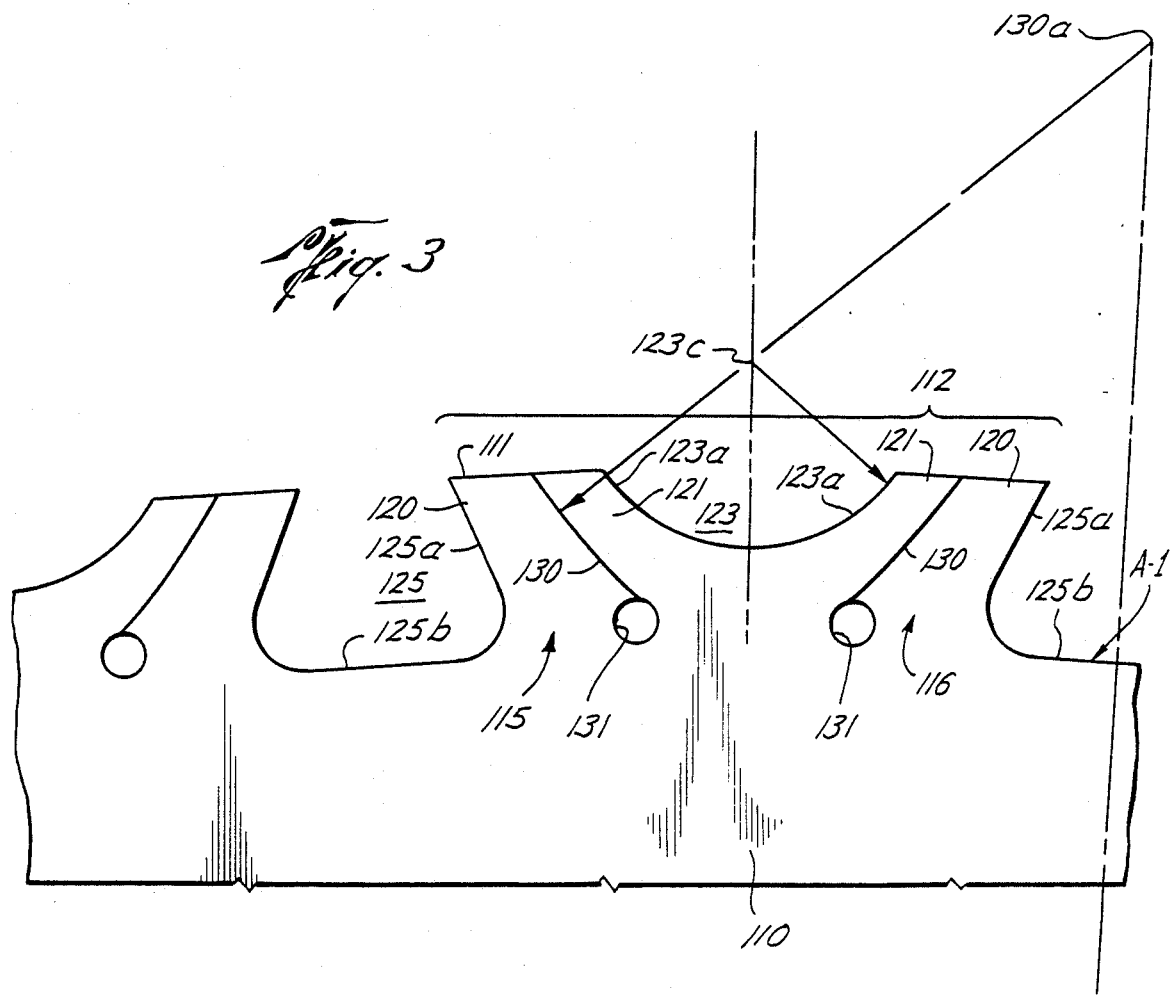
FIG. 3 is an elevation showing a modified form of the rasp blade shown in FIGS. 1 and 2, showing the teeth all in the same plane prior to lateral displacement.

In FIG. 3, a modified blade A-1 is illustrated, showing in detail only one set of teeth 112 which corresponds to the set 12 of FIGS. 1 and 2. It will be understood that the set 112 in the actual blade A-1 is repeated, usually in ten or more sets for the blade A-1 in the same manner as explained previously with respect to the blade A.

The blade A-1 has a body 110 and each set of teeth 112 has a first pair 115 and a second pair 116 which are inclined in opposite directions to each other. A first recess 123 is cut out or otherwise formed in the outer edge 111 of the body 110 and is disposed between the pairs of teeth 115 and 116. A second recess 125 is formed on each side of the set of teeth 112 to provide the edges 125a of the teeth 120. Also, each recess 125 has a lower edge 125b which may be part-circular as well as the shape illustrated in FIG. 3.

The pair of teeth 115 on the left as illustrated in FIG. 3 is shown with teeth 120 and 121. Similarly the pair of teeth 116 shown on the right hand side of FIG. 3 is shown with the same teeth 120 and 121 but disposed at opposite inclinations to the pair 115 so that the blade A-1 may be reversed and used when rotating in the opposite direction as previously explained.

The recess 123 is formed with an edge 123a which is a segment of a circle which has its center at a point 123c which is indicated in FIG. 3 above or outside of the outer edge 111 of the body 110. Thus, the cutout or recess 123 is less than a semicircle. The recess 123 may also be formed with the shape of the recess 23 in FIG. 1.

The teeth 120 and 121 in the pairs 115 and 116 are formed by a narrow slit 130 which is arcuate in shape and which has its center at a point outwardly of the outer edge 111, with the preferred point being illustrated at 130a in FIG. 3. The exact dimensions of the radius from the point 130a to the arcuate surface 130 may vary, but in the embodiment shown in FIG. 3, the radius of curvature of the slit 130 is greater than the radius of curvature of the surface 123a of the recess 123. Thus, there is a divergence from the outer edge of the trailing tooth 121 to the inner portion of the tooth 121, creating an increasingly greater width of the tooth 121 from its outer edge to the lower end of the slit 130. Tooth 120 has a width throughout its length at least as wide as its width at the outer edge 111. Holes 131 are preferably provided at the lower end of each of the slits 130 to minimize breakage in the same manner as explained above with respect to the holes 31 used with the slits 30 in FIG. 2. Again, by providing a construction wherein the narrow slit 130 is inclined at an angle from its outer edge, with the width of each of the teeth 120 and 121 throughout the length of each being at least as wide at its outer edge, no area of reduced thickness is introduced into the teeth 120 and 121, whereby greater strength for thus minimizing breakage in usage is accomplished.

Figure 3A:
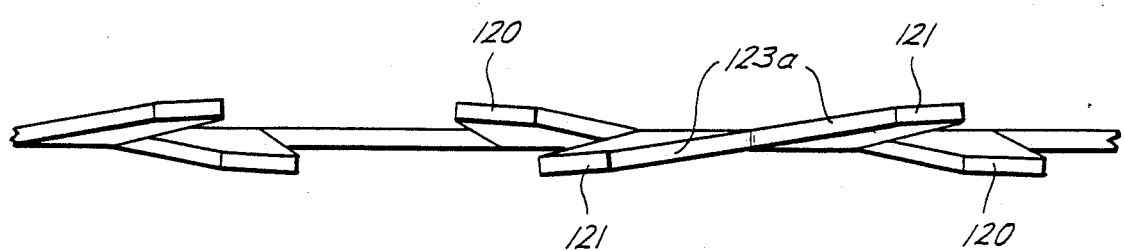
FIG. 3A is a plan view of one set of the teeth of the rasp blade of FIG. 3 in the preferred set or lateral displacement.

FIG. 3A shows a plan view of the teeth as preferably set or displaced laterally in the embodiment of the blade A-1. It will be appreciated that although the set of the teeth illustrated is the preferred set, other variations of the set for the blades A, A-1, of A-2 may be utilized such as shown in the various embodiments of U.S. Pat. No. 3,680,185.

In the use of the rasp blades of this invention, they are mounted on a conventional or other suitable rotatable hub, generally in rows so that there are a plurality of blades at the external surface of the hub for engagement with the surface of the tire to be cut and/or buffed to form the desired surface for receiving the re-tread material forming the new tread of the tire.

As briefly explained previously, the rasp blade A is made in segments of a circle and they are bolted or otherwise clamped to the hub to provide essentially a continuous buffing or cutting action on the tire surface to be prepared for the retreading. As indicated in FIG. 1 by the large arrow pointing in a counterclockwise direction, each of the rasp blades A encounters the external generally circular surface of the tire, with the lead tooth 20 in the pair 15 first engaging the rubber of the tire for the initial cutting action to remove the rubber from the tire. The trailing tooth 21 of the first pair 15 as illustrated in FIG. 2 is also inclined so that its leading edge formed at the slit 30 engages the rubber tire for additional cutting and removal of rubber from the tire surface.

The oppositely inclined teeth 20, 21 in the pair 16 as viewed in FIG. 2 have their their leading edges also in a position for engaging the tire surface. For example, the edge 23a of the tooth 21 in the pair 16 engages the rubber at a reversely inclined angle so that it provides a buffing or abrading action rather than cutting. Likewise the leading edge of the tooth 20 in the pair 16 at the slit 30 provides such buffing action.

When the blade A is reversed, and assuming that the hub on which the blade A is mounted is rotating in the same counterclockwise direction, it will be appreciated that the positions and the action of the pairs of teeth 16 and 15 will be reversed. Thus, the edge 25a of the tooth 20 in the pair 16 will become the leading edge of the entire set 12 and will provide the cutting action. It is possible, of course, to simply reverse the rotation of the hub to obtain the same effect as reversing the blade with the same direction of rotation. For example, if the blade A is rotated in the clockwise direction as viewed in FIGS. 1 and 2 rather than counterclockwise, the pair of teeth 16 would be the leading teeth and the pair of teeth 15 would be the trailing teeth.

Figure 2A:
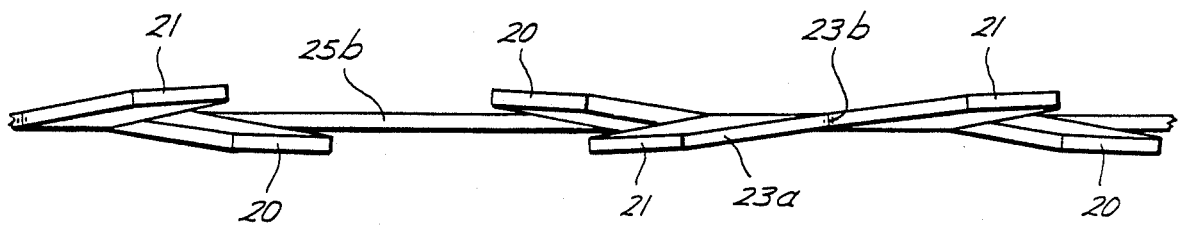
FIG. 2A is a plan view of the rasp blade of FIGS. 1 and 2, showing the preferred form of the set or lateral displacement of the teeth of the blade.

The form of the invention illustrated in FIGS. 3 and 3A functions essentially the same as the blade A in FIGS. 2 and 2A, except that the leading edge at the slit 130 for the tooth 121 in the pair 115 has less of a cutting action and more of an abrading or buffing action because of its reverse curvature as compared to the direction of rotation, assuming the rotation is in the counterclockwise direction as viewed in FIG. 3.

Figure 4A:
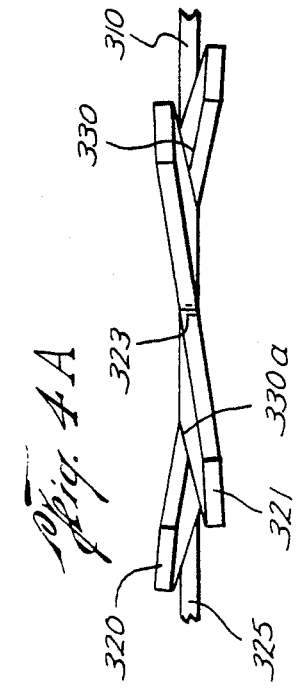
FIG. 4A is a plan view of the blade shown in FIG. 5, with the teeth set.

The form of the invention shown in FIGS. 4 and 4A has the substantially radially curved end 330a at the inner end of each slit 330. Because the curve of the end 330a is carried inwardly a distance which increases the effective width of tooth 321, and is normal to the line of cut at the outer edge, the strength of teeth 320 and 321 is equalized, and tooth 321 resists breakage to a far greater extent than if it extended substantially in line for the full length of the slit.

Figure 5A:
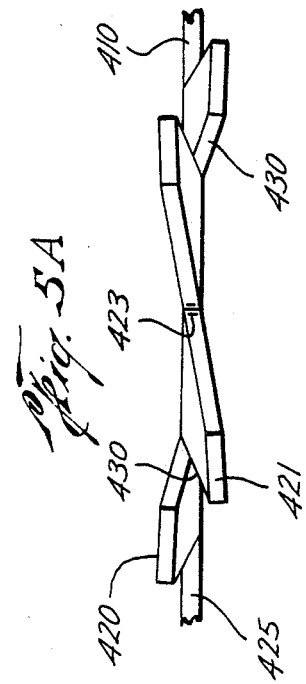
FIG. 5A is a plan view of FIG. 5, with the teeth set.

In FIGS. 5 and 5A, straight slits 430 terminate in triangular holes 431, the base of which is substantially parallel to the outer edge, and having point 431a extending in a direction towards second recess 425, but at a greater depth than the recess.

The form of the invention shown in FIGS. 6 and 6A is substantially the same as that shown in FIGS. 4 and 4A, and therefore, like parts bear the same numerals and letter designations. The first recesses 623 in FIG. 6 are at the same or substantially the same depth as the second recesses 325.

Although the teeth are shown in the drawings as having the same width at the outer edge in the various embodiments, it should be noted that the trailing teeth, e.g. teeth 21 in FIG. 2, may be wider than the leading teeth, e.g. teeth 20 in FIG. 2. More specifically, while both leading and trailing teeth may have a width at the outer edge of about 0.030 to 0.045 inch, when the teeth are of different widths, it is preferred that the width of the leading tooth at the outer edge is 0.035 inch, and the width of the trailing tooth at the outer edge is 0.040 to 0.045 inch. The increased width of the trailing teeth as compared to the leading teeth has been found to result in even less breakage of the teeth during use.

FIG. 7 shows a modified but preferred blade embodiment in which the slits are extended into the blade body in order that the setting of the teeth can commence inwardly of the recesses, with further increase in tooth strength and blade performance.

This embodiment is based on that shown in FIG. 4 and accordingly the same numbers are used in FIGS. 7, 7A, 7B, 7C, and 7D as in FIGS. 4 and 4A except for the addition of a prime mark after the numerals in FIGS. 7, 7A, 7B, 7C, and 7D.

As can be seen in FIG. 7, the slits 330a' are extended into blade body 310' beyond the depth of recess 325' to a point about 1½ to 1¾ times the depth of recess 325', with continuing curvature away from recess 323'. In FIGS. 7A and 7B, the form of setting which becomes practicable by virtue of this inward extension of slits 330a' is illustrated. In the preferred setting, alternate teeth 320' are set laterally from the body 310' about twice the thickness of the body 310', and teeth 321' are set to about the thickness of the body 310' as shown in FIG. 7B. The direction of setting alternates is best seen in FIG. 7A. The manner of setting is indicated at points marked $b_1$ and $b_2'$ $b_1$ showing the blade body 310' angled outwardly so as to displace the bottom of recess 325' to point $b_2$, the remaining outwardly disposed portion of tooth 320' lying in a plane denoted as $p_1$, parallel to body 310'. Similarly tooth 321' is set into plane $p_2$; also parallel to body 310', and on the opposite side. By reason of the difference in the amount of set of teeth 320' and 321' there are accordingly four rows of teeth, with all the teeth in a particular row being disposed in the same direction.

In the alternative setting of FIGS. 7C and 7D, teeth 320" and 321" are set equally to opposite sides an amount about equal to the thickness of body 310", the disposition of the tooth tips being essentially the same as in FIGS. 4A, 5A, and 6A. In contrast to prior forms of blades such as in U.S. Pat. No. 3,680,185, the extension of the slit 330a' shown in FIG. 7 and the corresponding extension of the slit 330a" in FIG. 7C enables the setting to be effected by bending the body 310" at an angle at point b₃, with a second angle at b₄ to cause tooth 320" to lie in a plane p₃ parallel to body 310", and similarly for tooth 321" in plane p₄. In this case, therefore, the teeth are set into two rows in planes parallel to and displaced an equal amount on opposite sides of the blade body, with the teeth of each pair oppositely set, and the teeth in each row alternately oppositely inclined.

It has been found that the blades of FIGS. 7, 7A, 7B, 7C, and 7D have had less tooth breakage over a longer period of satisfactory tire material removal and buffing action of tires than blades of the prior art.

The setting of the teeth to lie parallel to the blade body strengthens the teeth and contributes to free cutting and cooler operation.

Figure 8:
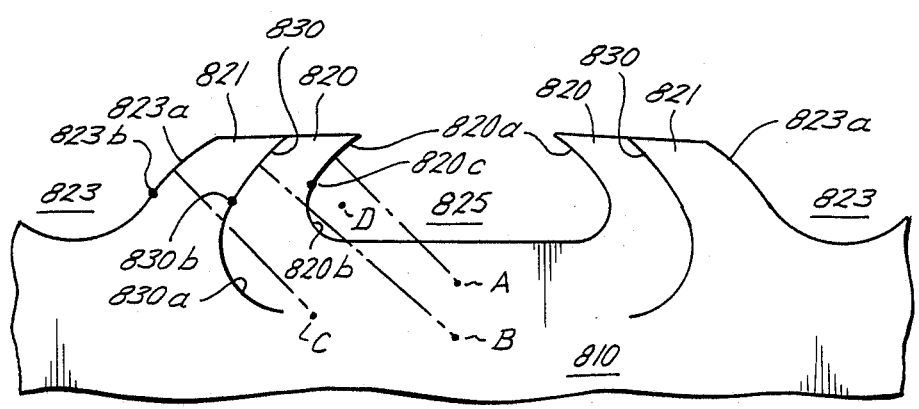
FIG. 8 is an elevation of part of a rasp blade in which the working portion of the teeth has forward curvature.

FIG. 8 is an elevation of a portion of a modified rasp blade which is similar to the rasp blade of FIG. 7 except that the working portion of the teeth have a forward curvature rather than being straight as in FIG. 7. Thus, in FIG. 7, the teeth edges or working surfaces 320a', 330' and 323a' are all straight without any curvature. However, in FIG. 8, the teeth 820 and 821 have working edges 820a, 830, and 823a which all have a curvature in the forward direction. By the term "forward direction" or "forward curvature", it is meant that the radius point for each of the surfaces 820a, 830, and 823a are inside of the body 810 of the blade. Illustrative radius points are shown in FIG. 8, with point A designating the radius point for the forward curvature of the edge or working portion 820a, with the letter B designating the radius point for the edge 830 of the slit of the tooth 821, and with the letter C designating the radius point for the surface 823a. Teeth with forward curvature as illustrated in FIG. 8 have sharper tips initially than the straight working edges as illustrated in FIG. 7. For general work, the straight edges shown in the blade of FIG. 7 with teeth having a straight working portion is preferable because the angle at the tooth tip remains almost constant as the outer blade edges are reduced by wear. As can be appreciated, with the forward curvature shown in FIG. 8, the tip angle increases rapidly with wear, for example 30° to 50° for the leading tooth tip.

Also, it should be understood that the tooth tip 820a which has the forward curvature merges with a curved portion 820b which has a radius of curvature from a radius point D and which essentially merges at a point shown by a dot 820c. Likewise the lower portion of the slit surface 830 is shown at 830a as having a curvature that merges at a point shown by a dot 830b. The forward curvature of the surface 823a merges at 823b with the curvature at the base of the notch 823.

Figure 9:
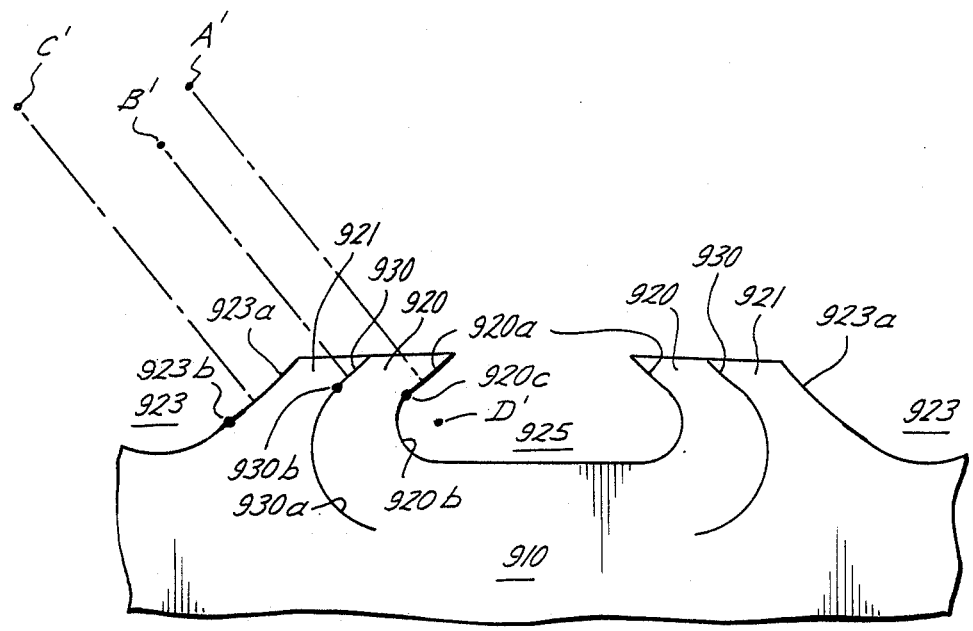
FIG. 9 is an elevation of part of a rasp blade in which the working portion of the teeth has reverse curvature.

Referring now to FIG. 9, such blade is a modification of that shown in FIGS. 7 and 8, with the numeral 9 preceding the numbers rather than the numeral 8 as used in FIG. 8. FIG. 9 has its working portion of the teeth such as the edges 920a, 930, and 923a formed at a "reverse curvature", which means that the edge is formed by a radius centered outside or beyond the outer blade edge. As illustrated in FIG. 9, the working portion 920a is formed by a radius with a center point at A', the working portion of the slit 930 is formed at a radius point B', and the working edge 923 is formed by radius point C'. Again, the reverse curvature portion 920a merges with a curved portion 920b which has a radius point D', and with the point of merging being indicated at 920c. Similarly, the reverse curvature portion 930 merges at point 930b with the curved portion 930a which has a radius inwardly thereof. The surface 923a which has the reverse curvature merges at 923b with the curvature in the notch 923.

The reverse curvature for the working portions of the teeth as indicated in FIG. 9 and as described above provides about the same initial cutting action as the straight teeth of FIG. 7, but the tip angle decreases with wear, for example 45° to 35°.

It should be understood that the term "working portion" of each of the teeth as used herein refers to the surface which engages the rubber or other tire material as the blade is rotated in use, and does not include the curved portion such as designated 330a' in FIG. 7.

The foregoing disclosure and description of the invention are illustrative and explanatory thereof, and various changes in the size, shape and materials, as well as in the details of the illustrated construction may be made without departing from the spirit of the invention.

We claim:

1. A tire rasp blade, comprising:
a blade body having an outer edge which is a segment of a circle;
a plurality of teeth formed at said outer edge in sets of four;
a first pair of teeth and a second pair of teeth in each set, with the two pairs disposed at opposite angles of inclination to each other;
said outer edge having a first recess in each set formed between the two pairs of teeth in each set;
the lead tooth in each pair of teeth having its leading edge formed by a second recess which extends from said outer edge;
the trailing tooth in each pair of teeth being formed between the edge of said first recess and a narrow slit extending inwardly from said outer edge;
said slit extending inwardly into said blade body to terminate at a depth greater than the depth of said second recess and being curved away from said first recess and also extending inwardly of the depth of said first recess; and the blade body being angled at the termination of each slit to displace each tooth laterally, said extension of said slits into the blade body enabling such displacement to commence inwardly of the recesses which provides increased strength and reduces breakage of the teeth in actual use.

2. The blade set forth in claim 1, wherein that portion of each tooth extending outwardly of the bottom of the recesses is lying generally in a plane parallel to said blade body.

3. The blade set forth in claim 2, wherein:
the teeth in each pair of teeth are set so that they are laterally spaced apart with their outer portions outwardly of the bottom of each recess substantially parallel to each other.

4. The blade set forth in claim 1, wherein
said trailing tooth in each pair has a working portion at the outer extent of each trailing tooth;
said first recess is formed at its outer portion by the working portion of the oppositely disposed trailing teeth in each of said sets, with each working portion merging with an inner curved portion; and
said working portion of each trailing tooth is substantially straight.

5. The blade set forth in claim 1, wherein said trailing tooth in each pair has a working portion at the outer extent of each trailing tooth;

said first recess is formed at its outer portion by the working portion of the oppositely disposed trailing teeth in each of said sets, with each working portion merging with an inner curved portion; and said working portion of each trailing tooth has a forward curvature with a different radius of curvature than the radius of curvature of said inner curved portion.

6. The blade set forth in claim 1, wherein said trailing tooth in each pair has a working portion at the outer extent of each trailing tooth;

said first recess is formed at its outer portion by the working portion of the oppositely disposed trailing teeth in each of said sets, with each working portion merging with an inner curved portion; and said working portion of each trailing tooth has a reverse curvature with a different radius of curvature than the radius of curvature of said inner curved portion.

7. The blade set forth in claim 1, wherein said trailing teeth and said lead teeth in each pair have a working portion at the outer extent of each tooth;

said first and second recesses are formed at their outer portions by the working portions of the oppositely disposed teeth, with each working portion merging with an inner curved portion; and said working portion of each of said teeth being substantially straight.

8. The blade set forth in claim 1, wherein said trailing teeth and said lead teeth in each pair have a working portion at the outer extent of each tooth;

said first and second recesses are formed at their outer portions by the working portions of the oppositely disposed teeth, with each working portion merging with an inner curved portion; and said working portion of each of said teeth has a forward curvature with a different radius of curvature than the radius of curvature of said inner curved portions.

9. The blade set forth in claim 1, wherein said trailing teeth and said lead teeth in each pair have a working portion at the outer extent of each tooth;

said first and second recesses are formed at their outer portions by the working portions of the oppositely disposed teeth with each working portion merging with an inner curved portion; and said working portion of each of said teeth has a reverse curvature with a different radius of curvature than the radius of curvature of said inner curved portions.

10. The blade set forth in claim 1, wherein:

each of the slits has an inner curved portion which curves in a direction towards said second recess.

11. The blade set forth in claim 2, wherein:

eadh of the slits has an inner curved portion which curves in a direction towards said second recess.

12. A tire rasp blade, comprising:

a blade body having an outer edge which is a segment of a circle;

a plurality of teeth formed at said outer edge in sets of four;

a first pair of teeth and a second pair of teeth in each set, with the two pairs disposed at opposite angles of inclination to each other;

said outer edge having a first recess in each set formed between the two pairs of teeth in each set;

the lead tooth in each pair of teeth having its leading edge formed by a second recess which extends from said outer edge;

the trailing tooth in each pair of teeth being formed between the edge of said first recess and a narrow slit extending inwardly from said outer edge;

said slit extending inwardly into said blade body to terminate at a depth greater than the depth of said second recess and being curved away from said first recess and also extending inwardly of the depth of said first recess;

the blade body inwardly of said teeth being angled at the termination of said slit to displace each tooth laterally, with that portion of each tooth extending outwardly of the bottom of the recesses lying generally in a plane parallel to said blade body; and said teeth being set in four rows with the teeth of each pair oppositely set, and the teeth in each row lying in substantially the same plane.

13. The blade set forth in claim 12, wherein the lead tooth in each pair is laterally offset from the blade body about twice the thickness of the body; and the trailing tooth in each pair is laterally offset from the body about the thickness of the body.

* * * * *